United States Patent [19]

Schobl

[11] Patent Number: 4,601,304

[45] Date of Patent: Jul. 22, 1986

[54] VALVE ASSEMBLY

[76] Inventor: Howard T. Schobl, P.O. Box 20, Imperial, Pa. 15126

[21] Appl. No.: 639,229

[22] Filed: Aug. 9, 1984

[51] Int. Cl.⁴ .................. F16K 43/00; F16K 41/02
[52] U.S. Cl. .................. 137/315; 251/214; 251/222; 251/223; 251/225; 251/330; 277/9; 277/105
[58] Field of Search ............ 251/214, 215, 221, 222, 251/223, 225, 264, 274, 330; 137/315; 277/9, 105, 106

[56] References Cited

U.S. PATENT DOCUMENTS

| | | | |
|---|---|---|---|
| 686,854 | 11/1901 | Huxley | 251/222 |
| 987,050 | 3/1911 | Curtin | 251/223 |
| 1,995,395 | 3/1935 | Mohr | 251/225 |
| 2,694,547 | 11/1954 | MacGregor | 251/264 |
| 2,809,059 | 10/1957 | Hillis | 277/9 |
| 3,982,729 | 9/1976 | Tricini | 251/214 |
| 4,289,317 | 9/1981 | Kuc | 277/9 |
| 4,394,872 | 7/1983 | Schobl | 277/9 |
| 4,411,438 | 10/1983 | Scobie | 277/105 |

FOREIGN PATENT DOCUMENTS

1332069  10/1963  France ..................... 251/214

Primary Examiner—G. L. Walton
Attorney, Agent, or Firm—Lawrence G. Zurawsky

[57] ABSTRACT

A valve assembly for providing easy and rapid removal of the valve packing means while the valve is in service, closed, or out of service, which assembly includes a valve body, a bonnet connected to the body, a packing housing assembly means secured to the bonnet, a packing gland mounted on the packing means assembly, a valve stem movably secured in the valve assembly and having a closure member adapted to seat selectively in a valve closure seat in the valve body or, in the back seat condition, in a valve closure seat in the bonnet. The valve stem is threaded at its lower end adjacent the closure means for engagment with matching threads secured in the bonnet. The packing assembly means includes a stuffing box or packing cartridge that is readily detachable from the bonnet to permit removal of the packing material while the valve is in service, closed, or out of service, without damage to the stem or interior surfaces of the packing means assembly. The packing means assembly contains a drive bushing secured in one end thereof, constructed and arranged for forcible displacement through the packing means assembly to displace the packing material thereform.

7 Claims, 7 Drawing Figures

VALVE ASSEMBLY

BACKGROUND OF THE INVENTION

1. Field of the Invention

This invention relates to valve apparatus providing easy and rapid means for replacing the valve packing, and particularly to valve apparatus having a packing container, such as a stuffing box or packing cartridge, that is easily and rapidly removed from, and replaced in, the valve assembly, especially while the valve assembly remains in service and while the valve stem is disengaged from the packing container.

2. Description of the Prior Art

In the maintenance of valves, removal and replacement of packing materials from around the valve stem in the valve bonnet previously has been a difficult, time consuming and expensive task. Because the valve packing becomes compressed, hardened, congealed and brittle in use, removal of the packing generally required removal from service and disassembly of the valve apparatus, which is expensive and time consuming. In addition, removal of the packing material itself generally required the use of sharp instruments such as hooks, picks, corkscrews, screwdrivers, scrapers, wire brushes and like implements that are likely to damage the highly ground or polished valve stem and interior surfaces of the stuffing box. Damage to those surfaces results in a failure rate of valve packing and intolerable fluid leaks arising from the loss of the static seal between the packing and the stem or between the packing and the interior surfaces of the valve bonnet or other structural elements. Such damage often required replacement of the stem or entire valve assembly.

Various types of valve apparatus have been suggested for packing removal. U.S. Pat. No. 4,394,872 describes such a device having an annular drive bushing mounted in the valve bonnet chamber subjacent the bottom of the packing material. A stem collar is carried on the valve stem. When the packing is to be removed, the valve is removed from service, and the packing gland is disconnected and fastened to the valve yoke. The valve stem is then rotated on its threaded portion through a bushing in the valve yoke and moved upwardly to bring the stem collar into contact with the drive bushing and thereby displace the packing materials from the packing chamber of the valve bonnet.

U.S. Pat. No. 4,394,872 also describes a valve assembly for packing removal from a back seat valve. When removing the packing material from that apparatus, the valve is set in the fully open condition on the back seat. The packing gland is removed and a wire cage or other protective device, is mounted on the valve assembly surrounding the top portion of that assembly. The valve body contains a fluid expansion chamber formed below the valve bonnet. A fluid is forcibly injected into the fluid expansion chamber to displace the drive bushing and packing materials upwardly from the packing chamber in the valve bonnet.

U.S. Pat. No. 2,809,059 describes a valve having an annular abutment element mounted in the bonnet chamber adjacent the bottom of the packing material. The abutment element has a transverse internally threaded bore hole through the side of the abutment element which must be aligned with a bore hole in the valve stem and with a threaded bore hole through the side wall of the bonnet. During conventional use of the valve, a threaded Allen screw is positioned through the bore hole in the bonnet wall and partially through the bore hole through the abutment element to lock the abutment element in place and prevent its movement when the valve stem is rotated. When it is desired to remove the packing, the bore hole in the stem must be aligned with the bore hole through the abutment element and the Allen screw must be inserted through the abutment element bore hole into the bore hole in the stem and beyond the interior surface of the valve bonnet chamber. The difficulty and disadvantage with that apparatus arises from the difficulty involved in achieving proper alignment of the bore holes between the valve stem and the abutment element and between the abutment element and the valve bonnet, in particular in view of the necessity of accounting for the vertical displacement of the valve stem inparted by the pitch of the threds on the valve stem upon its rotation. The operation becomes even more difficult as the valve seating surfaces wear, or remachining is performed, and the vertical positions of valve stem elements change with valve use. In any event, the packing material can not be removed or replaced while the valve is in service.

U.S. Pat. No. 3,237,917 describes a valve assembly in which the packing material is contained in a packing chamber of the valve bonnet and is supported by an intermediate bushing which rests on a lower bushing. The lower end of the valve stem has a cylindrical shoulder which could engage the lower bushing if the valve stem could be raised a sufficient distance. That operation is not possible with the structure shown in that patent because upward motion of the valve stem is restricted by several elements of structure. The packing gland is locked in threaded engagement with the upper end of the valve body to permit independent rotation of the upper gland. If the stem were rotated upwardly with the packing gland locked in place, the bushing and the packing material could not be displaced. On the other hand, removal of the packing gland introduces several problems. The packing gland can not be unscrewed from the upper portion of the valve body until after the valve stem handle and the bonnet are separately removed and the gland lock nut is loosened. In that condition, the packing gland can not be rotated outwardly simultaneously with the threaded stem because the compressed and hardened packing material will bind the stem and retain it within the valve body while the packing gland is rotated upwardly off the stem. If the packing gland is totally removed, the threaded stem will ride freely in the upper portion of the valve body and will not move upwardly upon rotation of the stem because of the loss of the stem's threaded connection to the packing gland which has been removed. With the packing gland removed, if the stem is forcibly jerked from the valve body to remove the packing, there is substantial danger of damaging the interior surfaces of the upper valve body and bonnet and the stem threads. In addition, that apparatus does not permit removal and replacement of the packing material while the valve is in service.

U.S. Pat. No. 3,157,381 describes apparatus having a chamber in the valve bonnet in which an annular resilient collar is mounted under the packing gland and a rigid annular carrier is mounted under the resilient collar. A sealing element is attached to the bottom portion of the rigid carrier in direct contact with the top surface of the valve closure member. That apparatus does not provide a container means for the sealing elements that is separate from, and readily removable from, the chamber surfaces in the valve bonnet. Hardening in use of the collar and sealing element would render difficult the displacement of those elements from the surfaces of the valve stem and the bonnet, especially because that apparatus provides no independent means to displace the collar and sealing element from the bonnet chamber without damaging the surfaces of the bonnet and the valve stem. In addition, that apparatus does not permit removal and replacement of the sealing elements while the valve is in service.

There remains a need for valve apparatus providing a container means for the valve packing elements which is physically separate from, and easily and rapidly removable from, the valve bonnet and other valve structural elements. There remains a further need for such a valve apparatus which permits easy and rapid removal and replacement of the valve packing elements while the valve remains in service.

SUMMARY OF THE INVENTION

In accordance with the present invention there is provided a valve apparatus that includes a valve body, a bonnet with a chamber extending through said bonnet, a packing means assembly removably secured to said bonnet, packing material secured within said packing means assembly, a packing gland mounted on the packing means assembly, a valve stem movably secured within the valve assembly and closure means connected to the valve stem, the bonnet and the valve body to provide for both conventional closure and back seat closure of the valve. The packing means assembly is constructed and arranged in the valve assembly to provide for rapid and easy removal and replacement of the packing means assembly and the packing material while the valve remains in service, in the back seat condition.

In a preferred embodiment of the apparatus of this invention, the packing means assembly comprises a stuffing box that is connected to the valve bonnet by threaded fasteners. In another preferred embodiment, the packing means assembly comprises a stuffing box connected to the bonnet by mutual engagement of threads on the stuffing box and on the bonnet. In a further embodiment of this invention, the packing means assembly comprises a packing cartridge slideably secured in the bonnet.

In all embodiments of this invention, the packing means assembly contains an annular drive bushing slideably secured in the packing means assembly below the packing material and constructed and arranged to displace the packing material from the packing means assembly upon application of force to the bottom of the drive bushing.

Accordingly, it is an object of the present invention to provide valve apparatus having self-contained means for rapid and easy removal of the valve packing material.

It is another object of the present invention to provide valve apparatus having self-contained means for a rapid and easy removal of the valve packing material while the valve is in service.

Another object of the present invention is to provide valve apparatus having self-contained packing removal means that can be actuated by avoiding involvement of the stem or causing substantial damage to the surfaces of the stuffing box or bonnet.

Still another object of the present invention is to provide valve apparatus having a readily removable and replaceable modular packing means assembly.

Those and other objects of the present invention will be more completely disclosed and described in the following specification, the accompanying drawings and the appended claims.

DESCRIPTION OF THE PREFERRED EMBODIMENTS

Figure 1:
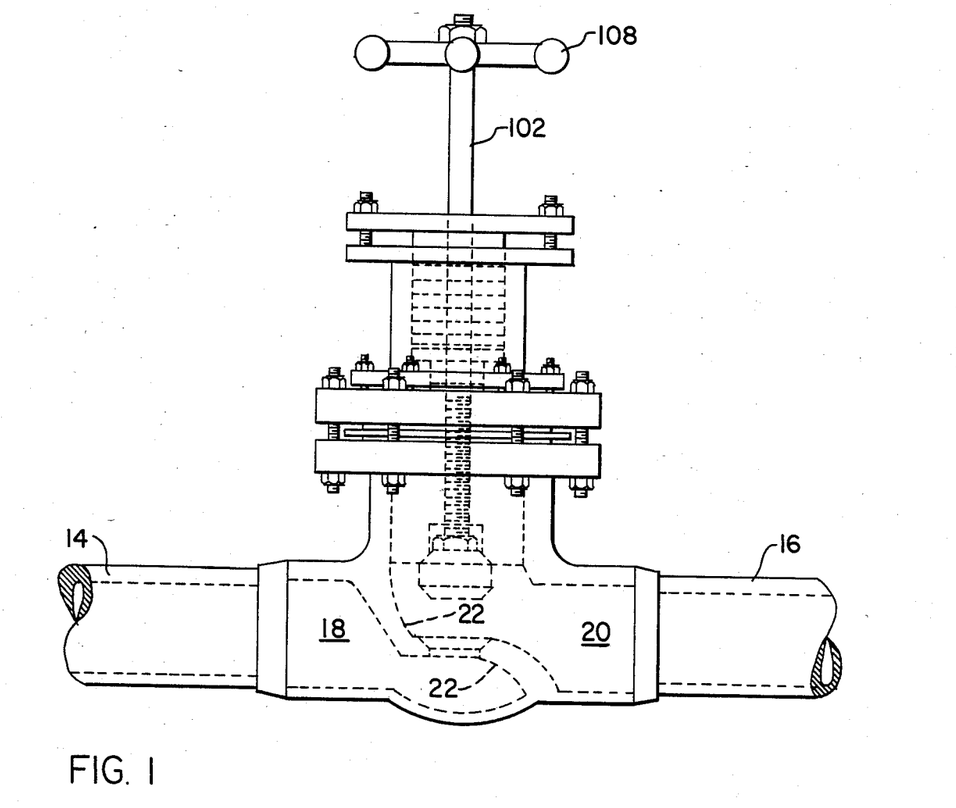
FIG. 1 is a side elevation view of a valve incorporating the packing means assembly and valve closure means of this invention.
Figure 2:
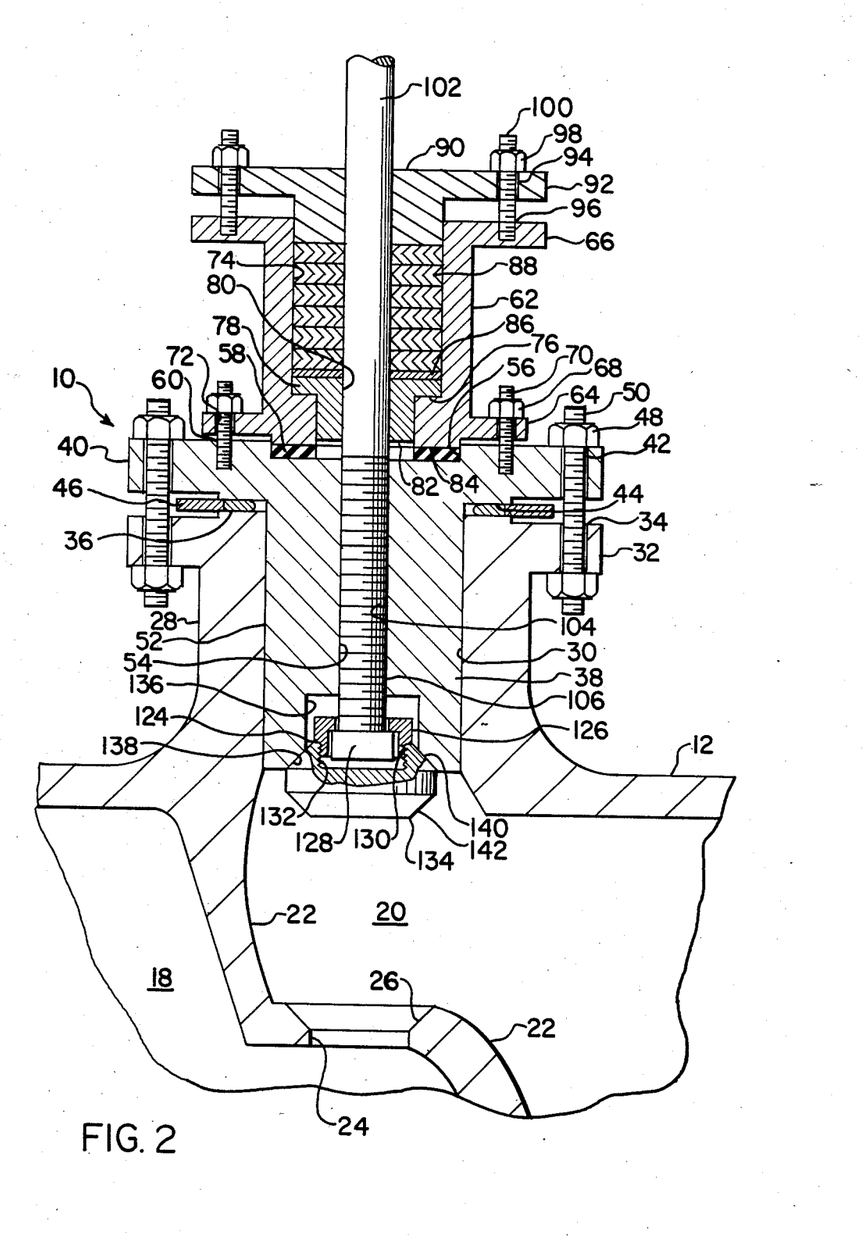
FIG. 2 is a side elevation view, partially in cross-section and partially fragmented, showing the conventional and the back seating closure means of this invention and showing a packing means stuffing box connected by threaded fasteners to the bonnet.
Figure 4:
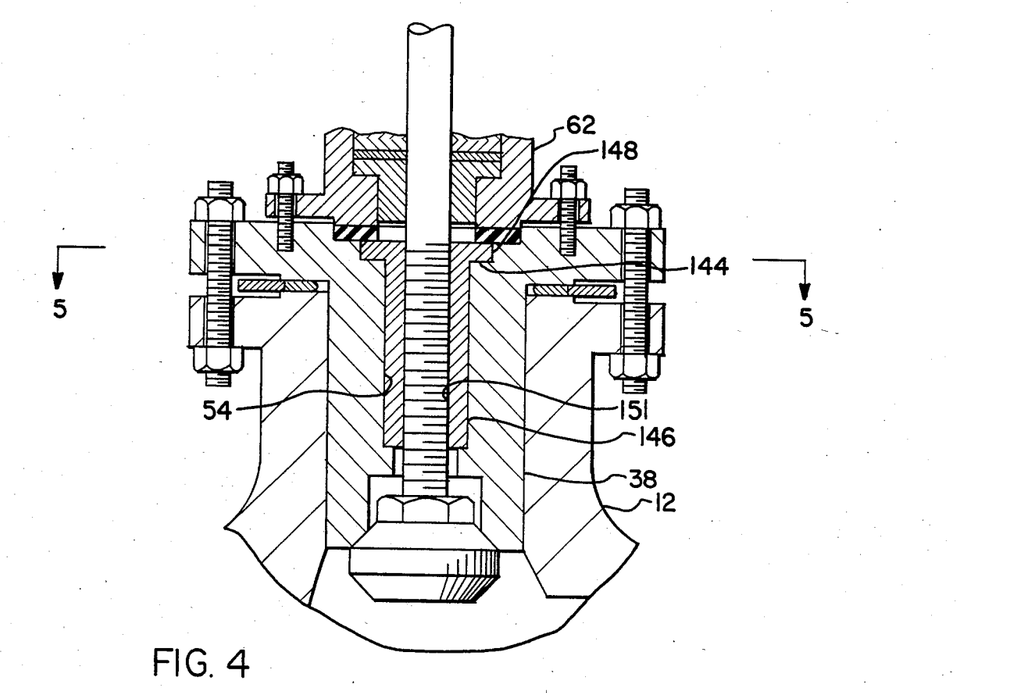
FIG. 4 is a side elevation cross-sectional view of an embodiment of this invention, showing a bonnet bushing securely mounted in the valve bonnet and threadably engaging the valve stem and having a polygonal end portion mounted in the valve bonnet.

Referring to the drawings, and particularly to FIGS. 1, 2 and 4, a valve indicated generally by reference numeral 10 has a body 12 connected in fluid communication with an inlet fluid conduit 14 and an outlet fluid conduit 16. The lower portion of valve body 12 encloses a lower fluid chamber 18 and an upper fluid chamber 20, which are separated by an internal wall member 22, which has an opening 24 extending therethrough and forming a tapered lower valve seat 26 in the wall member 22.

The upper portion 28 of valve body 12 has extending therethrough a central opening 30, which communicates with upper fluid chamber 20. Generally, central opening 30 has a circular transverse cross-section; however, in certain preferred embodiments of this invention which are described more fully below, the cross-sectional configuration of central opening 30 can be polygonal.

The upper portion 28 of valve body 12 has extending therefrom a flange 32 having extending therethrough a plurality of circular bores 34. On the upper surface of flange 32, a shoulder 36 surrounds the central opening 30.

A valve bonnet 38 is secured within the central opening 30 of valve body 12 in fluid tight engagement with the internal wall of valve body 12 surrounding central opening 30. The upper portion of bonnet 38 forms a flange 40, having a plurality of circular bores 42 extending therethrough. Bonnet flange bores 42 are constructed and arranged to permit alignment with the bores 34 in flange 32 of valve body 12. A shoulder 44 is formed on the bottom surface of flange 40 of bonnet 38 and is constructed and arranged for alignment with shoulder 36 on the top surface of flange 32 of body 12. A bonnet gasket 46 is secured between the shoulders 36 and 44. In assembly, bonnet 38 is secured to valve body 12 by nuts 48 and adjustable threaded studs 50 extending through the bores 34 and 42.

Generally, the lower portion 52 of bonnet 38 will have a circular transverse cross-sectional configuration, conforming to a similar circular configuration of the internal wall of valve body 12 surrounding central opening 30. However, in certain preferred embodiments of this invention, the transverse cross-sectional configurations of the lower portion 52 of bonnet 38 and of the interior wall surface of valve body 12 surrounding central opening 30 can be of matching polygonal configurations.

Bonnet 38 has a central longitudinal threaded bore 54 extending therethrough adapted to engage matching threads on the valve stem, described more fully below. On the top surface of bonnet 38, a recessed portion 56 surrounds the central bore 54 and is adapted to receive a stuffing box gasket 58. A plurality of threaded holes 60 are tapped in the top surface of flange 40 of bonnet 38 between the recessed portion 56 and the bores 42. In assembly, the tapped holes 60 function in securing a stuffing box or housing assembly 62 to the top surface of flange 40.

Stuffing box 62 has a lower flange 64 and an upper flange 66. Stuffing box 62 is secured to the top of bonnet 38 by a plurality of nuts 68 and threaded studs 70, extending through a separate plurality of bores 72 into the threaded bores 60 in the top surface of flange 40 of bonnet 38. A central longitudinal chamber 74 extends throughout stuffing box 62. A shoulder 76 is formed by the internal wall surfaces of stuffing box 62 at a lower portion of chamber 74. A drive bushing 78 is secured in the lower portion of chamber 74 in seating engagement with shoulder 76. Drive bushing 78 has a central passage 80 extending therethrough. The bottom surface 82 of annular drive bushing 78 can be coplanar with the bottom surface 84 of stuffing box 62; however, in a preferred emboiment of this invention, the bottom surface 82 of annular drive bushing 78 is recessed within the lower portion of chamber 74 some distance above the bottom surface 84 of stuffing box 62, which construction and arrangement facilitates the removal of packing material and other structural elements contained within chamber 74, in a manner described more fully below.

An annular junk ring 86 is mounted within stuffing box chamber 74 on top of annular drive bushing 78. A plurality of annular packing rings 88 are mounted within stuffing box chamber 74 on top of the annular junk ring 86. Packing rings 88 can consist of any suitable packing material such as Grafoil packing rings (manufactured by Union Carbide Corporation), Grafoil ribbon, graphite-impregnated asbestos fiber, wire reenforced packing rings, or other suitable materials.

An annular packing gland 90, having a flange 92, is slideably secured within stuffing box chamber 74 in contact with the upper surface of packing rings 88. Although packing gland 90 is shown in direct contact with the upper surface of packing rings 88, in other embodiments of this invention, there could be interposed between the bottom surface of packing gland 90 and the top surface of packing rings 88 one or more other structural elements such as an annular spacing ring or an annular junk ring similar to junk ring 86, as long as the structural elements are constructed and arranged to permit the application of compressive force through packing gland 90 to packing rings 88.

A plurality of holes 94 extend through flange 92 of packing gland 90 and are arranged for alignment with a plurality of tapped holes 96 in the upper surface of flange 66 of stuffing box 62. Packing gland 90 is connected to stuffing box 62, and the desired compressive force can be applied to packing rings 88 through packing gland 90, by tightening nuts 98 on threaded studs 100, extending through holes 94 on flange 92 of packing gland 90 into the tapped bores 96 on flange 66 of stuffing box 62.

Figure 7:
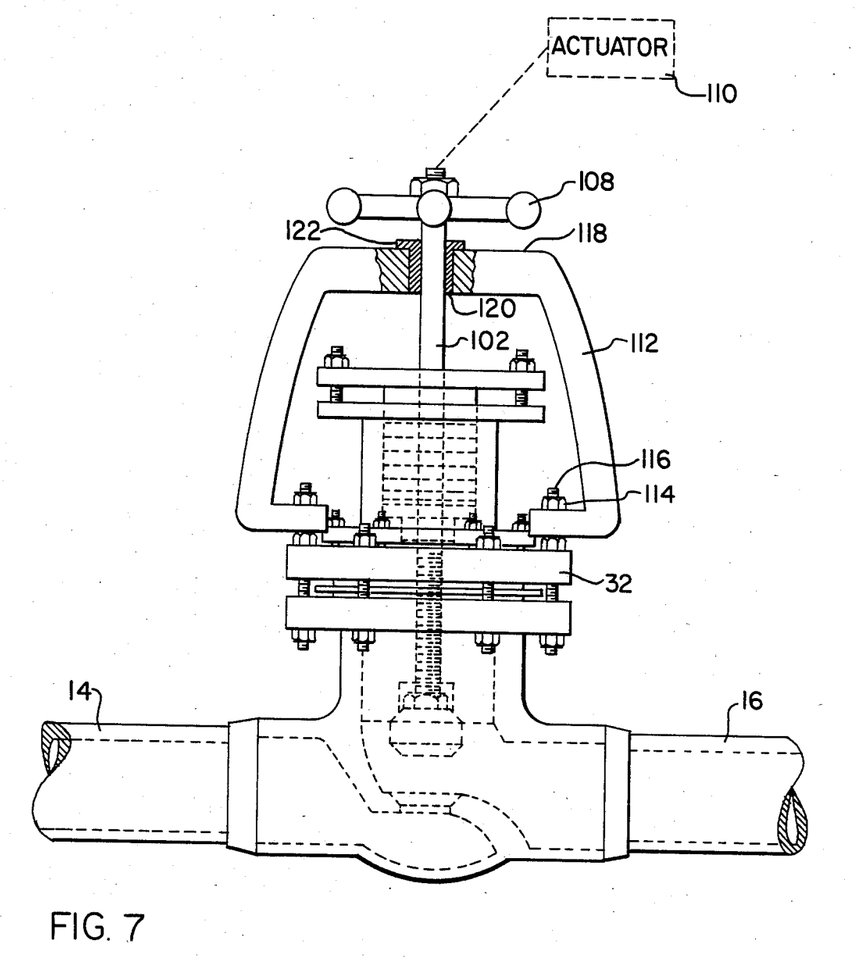
FIG. 7 is a side elevation view, partially fragmented and partially in cross-section, showing an embodiment of this invention in which the valve stem is actuated by manual means or by a motor or other actuating means, and showing a valve yoke connected to the bonnet and rotatably securing the valve stem.

A valve stem 102 extends through packing gland 90, packing rings 88, junk ring 86, drive bushing 78 and bonnet 38 into the upper fluid chamber 20. In one embodiment of this invention, valve stem 102 has a lower threaded portion 104 adapted to engage threads 106 on the internal wall surfaces of bonnet 38 which surround the central passage 54 extending through bonnet 38. As shown in FIGS. 1 and 7, valve stem 102 can be moved longitudinally in and out of fluid chamber 20 by rotation of a handle 108 connected to the end of valve stem 102 remote from valve body 12. Alternatively, as shown in FIG. 7, valve stem 102 can be rotated, or otherwise actuated, by means of a motor or other suitable actuator means 110, shown diagrammatically in FIG. 7. In one embodiment of this invention, threaded portion 104 on valve stem 102 and threaded portion 106 on bonnet 38 can be omitted, and valve stem 102 can be moved longitudinally in and out of fluid chamber 20 by an actuator means 110 constructed and arranged to slide valve stem 102 selectively in and out of the valve assembly.

As shown in FIG. 7, the valve assembly, if desired, can include a yoke 112 connected to bonnet flange 40 by a plurality of nuts 114 and threaded studs 116, equivalent to the threaded studs 50 described above. The top portion 118 of yoke 112 has a central opening 120 therethrough, in which is secured a yoke bushing 122, circumposed about the upper portion of valve stem 102. In a preferred embodiment, yoke bushing 122 is made from a material that is softer than, or dissimilar from, the material from which valve stem 102 is constructed, in order to prevent excessive wear of valve stem 102.

Figure 6:
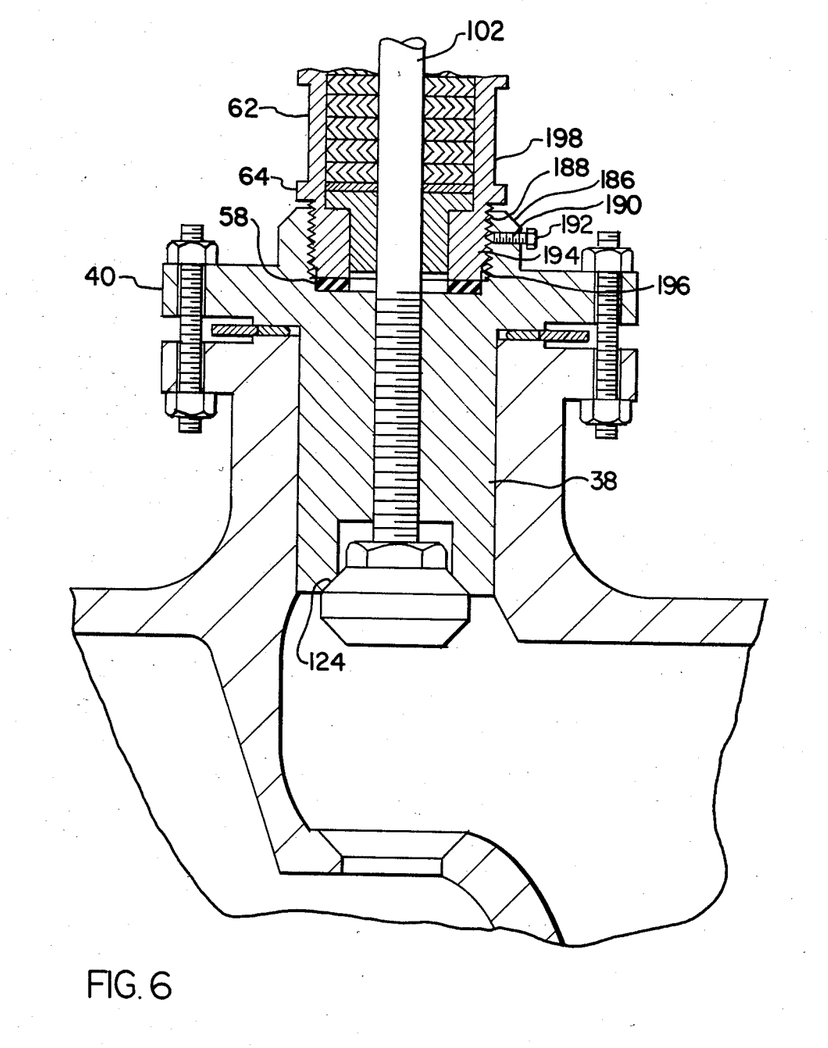
FIG. 6 is a side elevation, cross-sectional view showing an embodiment of this invention having a packing means stuffing box mounted in a valve bonnet collar by mutual threaded engagement, secured by a locking screw.

The structure of the valve closure means of this invention is shown most clearly in FIGS. 2, 4 and 6. The valve closure means, indicated generally by reference numeral 124, includes a collar 126 loosely mounted around the lower end of valve stem 102. A valve stem cap 128 is threadably secured on the bottom end of valve stem 102 within collar 126 to retain collar 126 on the lower end of valve stem 122. The outer wall surface of collar 126 has a threaded portion 130 adapted for engagement with a threaded portion 132 on the interior wall surfaces of a valve closure member 134. When collar 126 and closure member 134 are threadably engaged, they fit with some degree of tolerance, or looseness of fit, around valve stem 102 and valve stem cap 132 to permit effective fluid tight closure on the back seat closure regardless of wear of surfaces of the structural elements and regardless of vibration of the valve assembly when in use.

A preferred embodiment of this invention is constructed and arranged to permit removal and replacement of the valve stem packing means while the valve remains in service, permitting fluid flow therethrough. That structure is shown most clearly in FIG. 2, which shows a receptacle 136 formed in the lower portion of bonnet 38 and having a tapered, conical seat 138 adapted to engage in a fluid tight relationship with a corresponding conical section 140 on the upper portion of closure member 134.

The bottom portion 142 of closure member 134 is a tapered, conical surface adapted for fluid tight engagement with the matching tapered surface of seat 26 of wall member 22 in valve body 12. The engagement of lower conical portion 142 of closure member 134 with conical seat 26 in wall member 22 provides closure of the valve assembly in use or for removal and replacement of the packing means when the valve is out of service.

Figure 5:
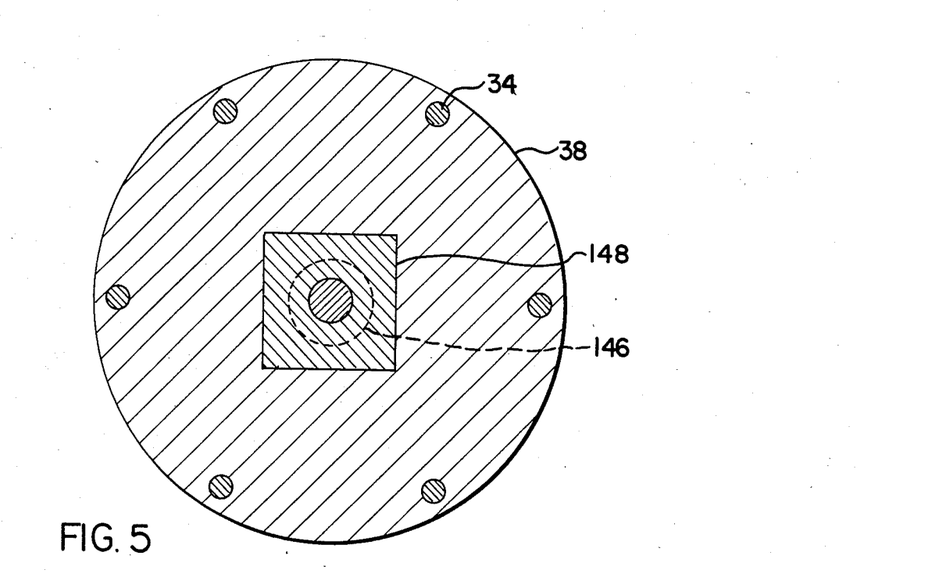
FIG. 5 is a plan view in cross-section showing the bonnet bushing structure depicted in FIG. 4.

Another embodiment of this invention is shown in FIGS. 4 and 5, wherein a shoulder 144 is formed in the internal wall surfaces surrounding passage 54 through bonnet 38 and the diameter of passage 54 is enlarged to receive a valve stem bushing 146.

Shoulder 144 has a square transverse cross-section configuration adapted to receive the square upper portion 148 of valve stem bushing 146. In other embodiments of this invention, the transverse cross-sectional configuration of shoulder 144 and the upper portion 148 of bushing 146 can be of some other polygonal configuration other than square. Bushing 146 has internal threads 151 constructed to mate with threads 104 on valve stem 102. If the valve stem 102 and bonnet 38 are constructed of stainless steel, or similar material, bushing 146 can be constructed of a softer, or nonferrous, material adapted to prevent galling of the threads. The square or other polygonal, transverse cross-sectional configuration of the upper portion 148 of bushing 146 prevents the bushing from turning under normal operation of the valve. The force applied by connection of the stuffing box 62 to flange 40 of bonnet 38 retains bushing 146 in vertical position and prevents upward thrusting or other movement of bushing 146.

Figure 3:
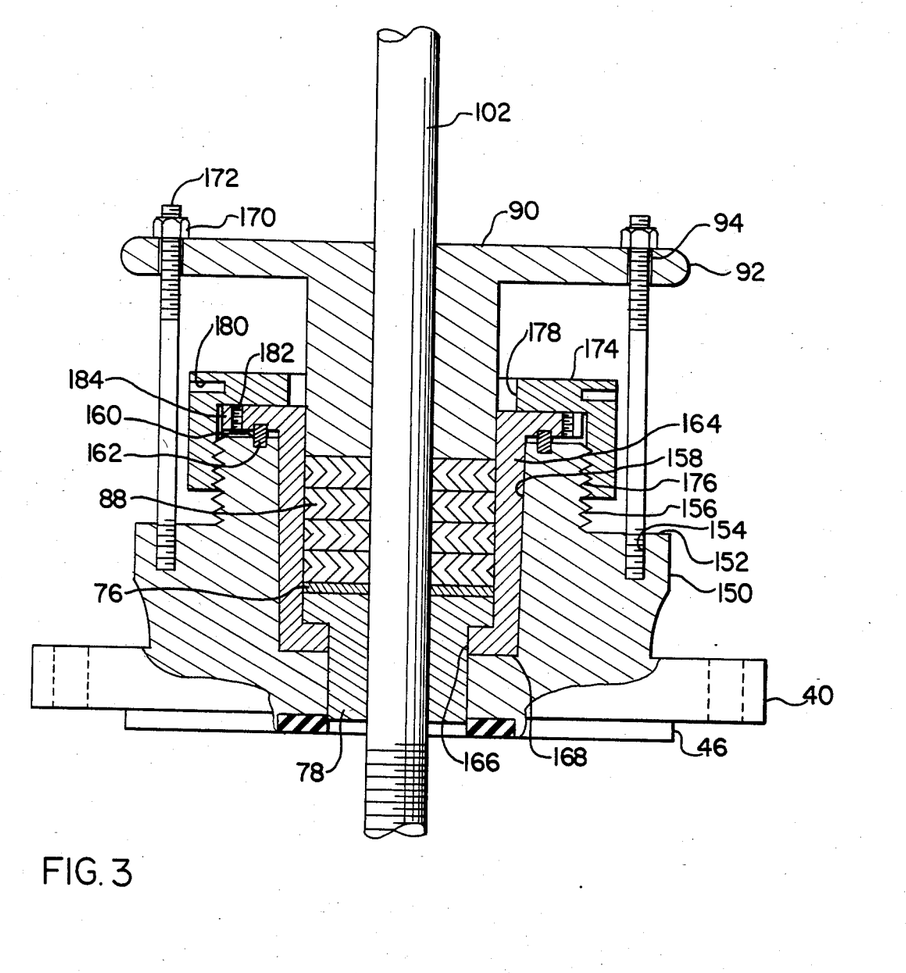
FIG. 3 is a side elevation view, partially in cross-section and partially fragmented showing the embodiment of this invention comprising a replaceable packing cartridge mounted within the valve bonnet.

FIG. 3 shows another embodiment of this invention providing a removable packing cartridge as part of the valve assembly. In that embodiment, bonnet 38 includes an upper portion extending above flange 40 comprising a cartridge housing 150 having a shoulder 152 and a plurality of tapped, threaded holes 154. Cartridge housing 150 has an externally threaded upper portion 156 and a cartridge chamber 158 having an inwardly extending shoulder 168 at the bottom of the cartridge chamber 158. The top surface of cartridge housing 150 has a seat 160 for a cartridge gasket 162. A packing cartridge 164 is slideably mounted in cartridge chamber 158 and has an inwardly extending shoulder 166 at the lower end of packing cartridge 164, which shoulder 166 seats on shoulder 168 of cartridge housing 150. Packing cartridge 164 contains the structural elements of the packing assembly including drive bushing 78, junk ring 76, packing rings 88 and the lower portion of packing gland 90, which is secured to cartridge housing 150 by a plurality of nuts 170 and threaded studs 172, passing through holes 94 in flange 92 of packing gland 90 and into the tapped holes 154 in shoulder 152 of cartridge housing 150. Packing cartridge 164 is secured in assembly by a bonnet cap 174 having threads 176 adapted to engage threads 156 on cartridge housing 150. Bonnet cap 174 has a central opening 178 therethrough to permit the insertion of packing gland 90 in assembling the valve. Bonnet cap 174 also contains at least one pair of diametrically opposed tapped holes 180 adapted to engage a spanner wrench or other appropriate tool for threading bonnet cap 174 onto bonnet housing 150. To remove packing cartridge 164 from the valve assembly, handle 108 is removed from the valve stem 102 and packing gland 90 is removed. After removal of bonnet cap 174, packing cartridge 164 can be lifted from cartridge chamber 158. To assist in removing packing cartridge 164, the cartridge is provided with an upper flange 184 having extending therethrough a plurality of threaded jacking holes 182, through which jacking bolts (not shown in the drawing) can be inserted and rotated to lift packing cartridge 164 from the cartridge chamber 158.

FIG. 6 shows still another embodiment of this invention, providing alternative means for connecting a stuffing box or packing cartridge to the valve bonnet. In FIG. 6, a bonnet collar 186 extends upwardly from flange 40 of bonnet 38. Collar 186 has internal threads 188 and a transverse threaded bore 190 extending through the side wall of collar 186. A thread locking screw 192 is secured in bore 190. Stuffing box 62 has an extended portion 194 below collar 64, which extended portion 194 has threads 196 adapted to engage the threads 188 of bonnet collar 186. At least the lower portion 198 of stuffing box 62 has a polygonal, or non-round, periphery to permit the use of a suitable tool in the installation or removal of stuffing box 62.

The apparatus of this invention provides an easy and rapid method for changing or replacing the valve stem packing material and the packing means assembly. Although the apparatus of this invention provides improved means for removing and replacing valve packing elements while the valve is in the fully closed condition, or is out of service, the apparatus of this invention is particularly advantageous in permitting valve packing material removal and replacement while the valve is in service, with the valve stem closure means set in the back seat condition. To remove and replace the packing material, the operator removes the valve stem handle or other actuator means. With respect to the apparatus shown in FIG. 7, yoke 112 is removed by removing the nuts 114 and sliding yoke 112 upwardly off valve stem 102. With respect to the apparatus shown in FIGS. 2 and 4, packing gland 90 is removed, nuts 68 are removed from studs 70 and stuffing box 62 is lifted upwardly over valve stem 102. With respect to the apparatus shown in FIG. 6, after the packing gland is removed, threaded lock screw 192 is loosened and stuffing box 62 is unscrewed from bonnet collar 186 by use of a suitable tool. With respect to the apparatus shown in FIG. 3, after packing gland 90 is removed, a spanner wrench, or other suitable tool, is used to unscrew bonnet cap 174 from cartridge housing 150 and packing cartridge 164 is lifted from cartridge housing 150 either manually, or by use of jacking bolts, or by another suitable tool.

The present invention provides the advantage that packing materials can be replaced quickly in the valve assembly by removing the old stuffing box or packing cartridge and replacing it immediately with a new stuffing box or packing cartridge containing the various structural elements including the drive bushing, the junk ring and the packing rings. Such replacement packing modules can be prepared on site or can be obtained from various suppliers. When the packing rings are to be replaced, that operation can be completed without damage to the surfaces of the valve stem and the stuffing box or packing cartridge by forcibly displacing drive bushing 78 upwardly through stuffing box 62 of packing cartridge 164 to displace the junk ring 76 and the packing rings 88 from their container. If drive bushing 78 can not be displaced from the packing container by simple manual force, a wooden dowel or brass billet can be driven against the bottom of drive bushing 78 by the careful application of continuous or intermittent force until the packing rings are freed.

Drive bushing 78 can be constructed of any suitable rigid material and preferably of metal or other material that is relatively softer than the structural material used for valve stem 102 and for the construction of stuffing box 62 or packing cartridge 164. Use of such materials of construction will prevent scratching or other damage to the surfaces of the valve stem and the packing material container during displacement or replacement of the packing rings.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

Therefore, I claim:

1. In a valve having a body for the passage of fluid; a threaded valve stem; and
a bonnet connected to said body and having a threaded opening to receive said valve stem;
the improvement comprising a separate packing housing assembly means sealingly connected to said bonnet and being removable from said bonnet and including:
a packing material chamber within said packing housing assembly means through which a portion of said valve stem extends;
an annular drive bushing in said packing material chamber adjacent to said bonnet and surrounding said valve stem;
a packing gland in said packing material chamber remote from said bushing and surrounding said valve stem;
packing material comprising a plurality of packing material elements in said packing material chamber compressively engaged between said drive bushing and said packing gland, each of said packing material elements having a central opening through which said valve stem extends;
means for urging said packing gland into said packing material chamber;
whereby
(a) said packing means assembly may be removed from said bonnet while said valve stem remains operative in threaded engagement with said bonnet; and
(b) whereby said annular drive bushing and said packing material can be pushed through said packing material chamber for replacement upon complete removal of said packing housing assembly means from said bonnet.

2. The improvement of claim 1 wherein said packing housing assembly means has a first radial flange at one end for connection to said bonnet and has a second radial flange at the other end; said packing gland has a radial flange corresponding to said second radial flange of the packing housing assembly means; fastening means for joining said packing gland flange with said second radial flange.

3. The improvement of claim 1 wherein said packing housing assembly means is threadedly secured to said bonnet.

4. The improvement of claim 1 wherein said packing housing assembly means has a uniform polygonal exterior cross-section.

5. The improvement of claim 1 wherein said packing material chamber has a central cylindrical bore of smaller diameter than said chamber adjacent to said bonnet; and
wherein said annular drive bushing has a base which fits into said bore and has a radial flange corresponding to the said cylindrical bore of said packing material chamber.

6. In a valve having a body for the passage of fluid; a threaded valve stem; and
a bonnet connected to said body and having a threaded opening to received said valve stem;
the improvement comprising a separate packing housing cartridge means sealingly connected to said bonnet and being removable from said bonnet and including:
a chamber in said bonnet circumposed about a portion of said valve stem for receiving said cartridge means, and said cartridge means having therein;
an annular drive bushing adjacent to said bonnet and surrounding said valve stem;
a packing gland remote from said bushing and surrounding said valve stem;
packing material comprising a plurality of packing material elements compressively engaged between said drive bushing and said packing gland, each of said packing material elements having a central opening through which said valve stem extends;
first fastening means for urging said packing gland into said cartridge means;
whereby
(a) said cartridge means may be removed from said bonnet while said valve stem remains operative in threaded engagement with said bonnet; and
(b) whereby said annular drive bushing and said packing material can be pushed through said cartridge means for replacement upon complete removal of said cartridge means from said bonnet.

7. The improvement of claim 6 including second fastening means for retaining said cartridge means in said chamber.

* * * * *